June 28, 1966   C. J. BROWN. JR   3,258,253
METHOD OF AND APPARATUS FOR MIXING GLASS BATCH MATERIALS
Filed Oct. 27, 1961   2 Sheets-Sheet 1

INVENTOR.
Chester J. Brown, Jr.
BY
Nobbe & Swope
ATTORNEYS

June 28, 1966  C. J. BROWN. JR  3,258,253
METHOD OF AND APPARATUS FOR MIXING GLASS BATCH MATERIALS
Filed Oct. 27, 1961  2 Sheets-Sheet 2

INVENTOR.
Chester J. Brown, Jr.
BY
Nobbe & Swope
ATTORNEYS

United States Patent Office 3,258,253
Patented June 28, 1966

3,258,253
METHOD OF AND APPARATUS FOR MIXING GLASS BATCH MATERIALS
Chester J. Brown, Jr., Toledo, Ohio, assignor to Libbey-Owens-Ford Glass Company, Toledo, Ohio, a corporation of Ohio
Filed Oct. 27, 1961, Ser. No. 148,078
4 Claims. (Cl. 259—146)

The present invention relates broadly to the intermixing of granular materials and more particularly is concerned with an improved method of and apparatus for distributing a wetting medium into dry glass batch materials as they are mixed.

A principal object of the invention is to provide an improved method of and apparatus for distributing a wetting medium into and onto the discrete particles of dry glass batch materials to reduce subsequent segregation thereof.

Another object of the invention is to provide an improved method of and apparatus for directing a fine pressurized spray of water into the path of intermixed discrete batch particles to produce a uniformly wetted condition in an entire quantity of batch material.

Another object of the invention is to provide a method for admixing a wetting medium into a batch of dry material wherein localized over-wetting of the material will be prevented and an equally wet condition will be produced throughout the resulting mixture.

Another object of the invention is to provide an improved apparatus for practicing methods of the above character which apparatus is specifically adapted for use in connection with horizontal rotary drum-type mixing apparatus.

Other objects and advantages of the invention will become more apparent during the course of the following description when read in connection with the accompanying drawings.

In the drawings, wherein like numerals are employed to designate like parts throughout the same:

Figure 1:
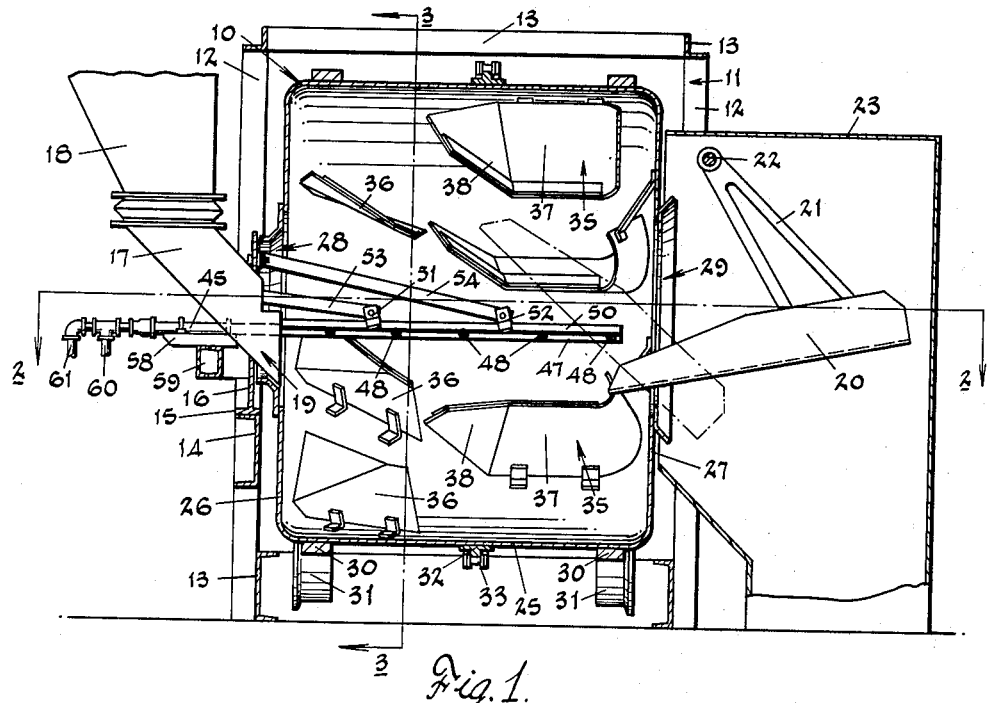
FIG. 1 is a longitudinal vertical cross section of a mixing apparatus in which the method of the invention can be practiced.

Briefly stated, this invention is directed to improvements in the mixing of glass batch materials which are ultimately to be delivered into a glass-melting furnace together with proportionate amounts of glass cullet. While various materials are employed to produce glasses having particular optical qualities or for certain specific purposes, the materials employed to produce regular window or plate glass generally include proportionate amounts of sand, limestone (high calcium), limestone (dolomite), soda ash, salt cake, carbon and rouge. These quantities of the batch materials consist of discrete particles of various specific gravities which will initially blend together but which during subsequent handling have been found to separate out or become segregated to the end that when the batch is introduced into the glass-melting furnace, it is then not suitably intermixed to obtain rapid and satisfactory melting into a molten mass of proper homogeneity. Analytical evidence indicates that the various materials of heavier specific gravity or differing particle diameters tend to separate into discrete fractions. Segregation of the materials after discharge from the mixer and during subsequent handling, and the uncontrollable loss of a considerable amount of the finer materials escaping as dust from the top of the fill, or as so-called "batch carryover" through the burner ports of the furnaces into the checker-work of the adjoining regenerators, adversely affects the batch composition and in turn is a major cause of poor quality glass.

One obvious expedient to remedy the above-mentioned conditions has been to add a liquid, such as water, to the dry batch materials, thereby moistening the same and causing the discrete particles to form into an agglomerated mass. Such an apparently simple solution has not, however, been easily carried into effect due to the fact that unless the liquid is uniformly distributed throughout the batch in its entirety, certain portions thereof become overly charged with the liquid. This condition materially reduces the effectiveness of the mixing operation during the "wet-mixing" phase, thereby limiting the degree of chemical homogeneity achieved. It also results in adherence of excessively wetted batch portions to the walls of the mixer, thus further aggravating the problem of achieving a high state of chemical homogeneity.

This invention contemplates the provision of methods for properly and thoroughly distributing a liquid into and throughout a supply of dry batch materials as well as improved apparatus for achieving this end. Moreover, the invention is directed to application of the methods in connection with mixing apparatus in which dry batch materials are intermixed while being carried in a vertical path of motion. Essentially this is realized by cylically mixing the dry materials, distributing water therethrough according to a carefully controlled spray pattern, and then continuing the mixing after the application of the water has been discontinued.

Figure 2:
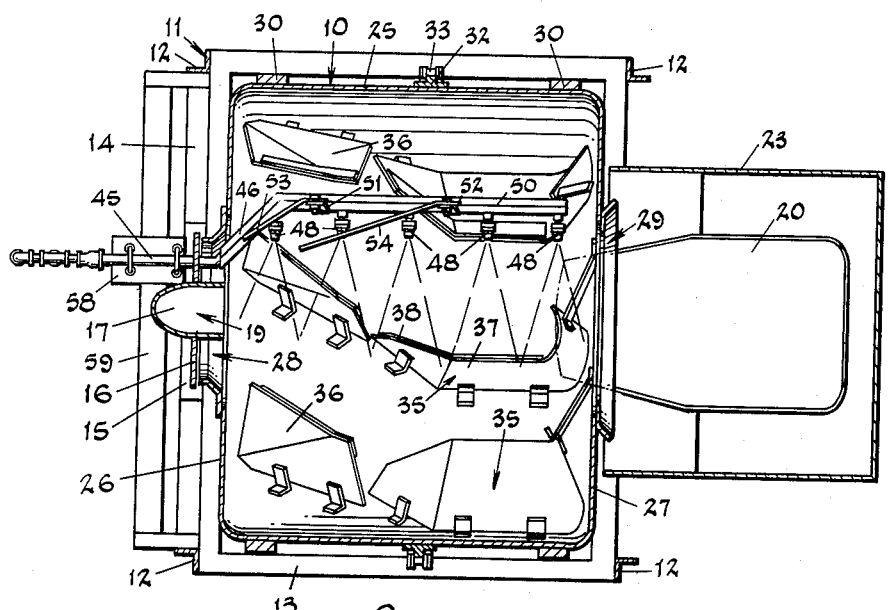
FIG. 2 is a horizontal view as taken on line 2—2 of FIG. 1.
Figure 3:
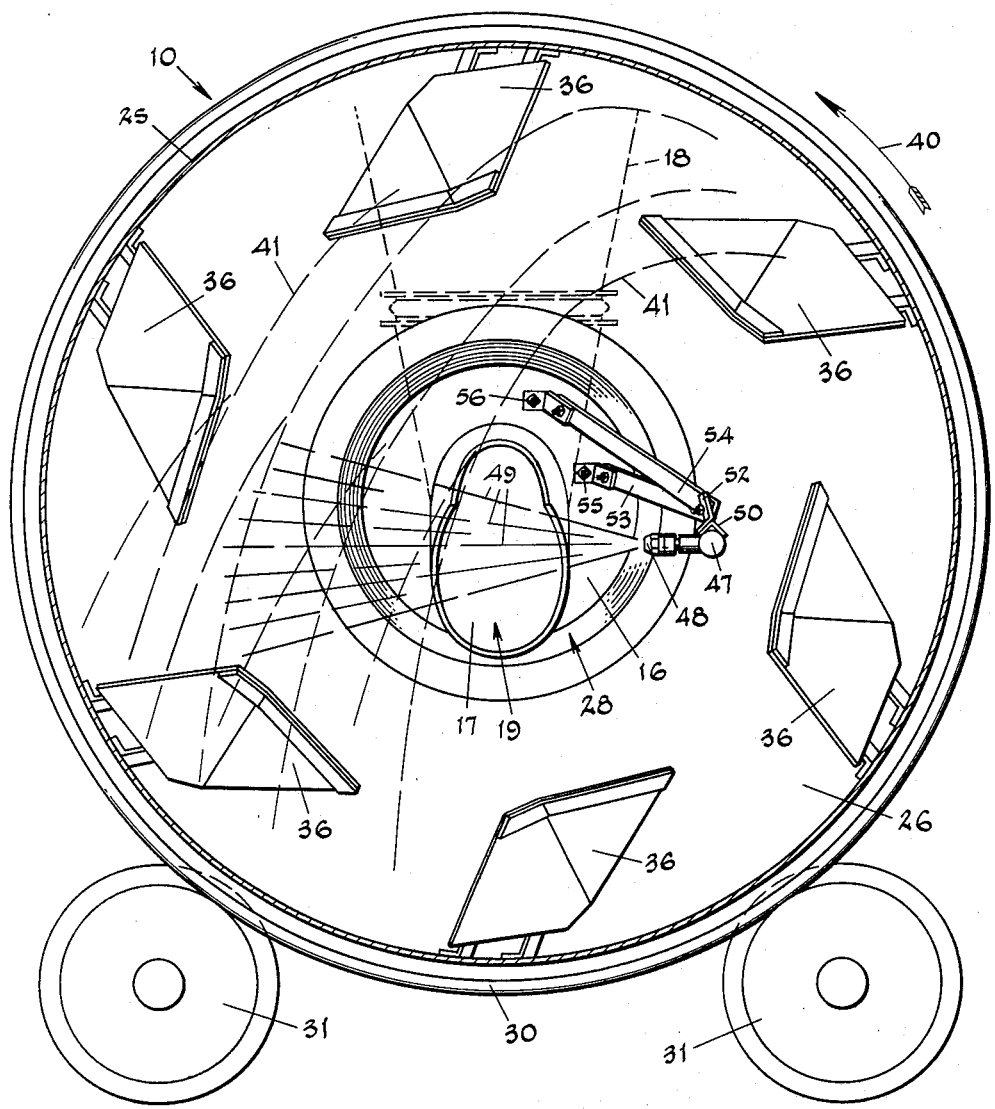
FIG. 3 is a transverse vertical view as taken on line 3—3 of FIG. 1.

Referring now particularly to FIGS. 1, 2 and 3 of the drawings, there is shown a conventional type of rotary drum mixing apparatus in which a batching drum is supported for rotation about a horizontally disposed axis. In this manner of operation, the batch material, while being moved through a vertical plane and raised from the lower area of the drum and dropped from an upper area thereof, are also caused to be laterally thrust to and fro between the ends of the drum. Continuous rotation of the drum thus produces complete intermixing of the discrete particles of the batch as they are centrifugally and turbulently caused to intermingle. For purposes of illustration, the disclosed apparatus includes a rotary mixing drum 10 operatively contained within a frame structure 11.

Briefly stated, the structure 11 comprises vertically disposed members 12 interconnected by horizontally disposed members 13. Also arranged between two of the vertical members 12 at one end of the frame structure is a channel 14 supporting a bracket 15 having a vertically disposed plate 16 in which the supply hopper 17 is secured. The hopper is suitably connected to a chute, generally indicated at 18, and its discharge end 19 is adapted to be inserted through an opening provided in an end wall of drum 10 to direct the materials to be mixed into the interior of the drum. In the oppositely disposed end wall, a similar opening is provided to permit a discharge pan or chute 20 to be moved into the drum upon completion of the mixing operation. For this purpose, the chute 20 is carried by a bracket 21 mounted on shaft 22 which upon partial rotation will swing the chute from the full line "closed" position of FIG. 1 to a position substantially as indicated in broken line in which the mixed material will be received on the inclined chute and discharged downwardly through a housing 23 into suitable containers or "batch cans" (not shown).

The rotary mixing drum 10 is formed with an annular wall 25 and oppositely disposed end walls 26 and 27; the wall 26 having a centrally disposed opening 28 for receiving the hopper 17 and the wall 27 a like opening 29 through which the pan 20 is moved. In spaced relation to the opposed end walls are a pair of bearing rings 30 secured to the outer surface of annular wall 25 and adapted to support the drum for rotation about a horizontal axis on spaced support rollers 31 generally mounted on the structure 11. The wall 25 also carries a sprocket ring 32 about which a chain belt 33 is trained to drive the drum from a source of power (not shown). Contained within the drum and mounted in radially spaced relation to one another are a plurality of buckets 35 and blades or vanes 36 which are adapted to develop a mixing turbulence throughout the discrete materials introduced into the drum and fully intermix the same while the drum is rotated.

Usually the buckets 35 are arranged adjacent one end of the drum in which the bulk or major portion of the batch is to be contained while the vanes are oppositely disposed adjacent the opposite end of the drum. The buckets 35 and vanes 36 are generally supported on the inner surface of the wall 25 at a "leading" angle inclined forwardly, in the direction of drum rotation, to a plane normal to the wall surface. The vanes 36 are also bodily located at an angle to the major plane of the wall 37 of the buckets which creates a spiral relation therebetween. Each wall 37 of the buckets 35 includes a deflector portion 38 which is substantially aligned with an adjoining vane 36 whereby a horizontally directed thrust will be imparted to material gathered by the vanes to urge said material toward the buckets. The buckets thus operate to scoop the bulk of the batch material as they progressively pass through the lower sector of their rotary motion while the deflector portions 38 and vanes 36 simultaneously cause the "scooped" portions to shift in an endwise direction across the drum. Due to the angular plane in which the buckets and blades are mounted, the contained portions of the batch materials are carried upwardly and as the buckets and blades move through the upper sector of their motion, said portions slide therefrom and drop into the mass in the lower sector.

In the use of this type of apparatus for the particular purpose of mixing dry glass batch materials and with the drum 10 rotating in the direction of arrow designated by the numeral 40 in FIG. 3, the buckets 35 and vanes 36 cooperate to shift or thrust the materials along an inclined path toward the end wall 27 while they simultaneously lift portions thereof from the lower sector or low area of the drum and then spill the materials as they are moved through the upper sector. The resulting turbulent, cascading effect is somewhat shown by the several curved lines designated by the numeral 41 which are intended to indicate that as the buckets and vanes incline downwardly, the contained portions of the material fall therefrom and descend in centrifugally outwardly and downwardly directed paths of motion.

Now it is believed apparent that the entire bulk of the batch materials, during rapid rotation of the drum, will be caused to thoroughly intermix and that during a predetermined period of operation will have been caused to fall repeatedly through paths indicated by the lines 41. It has thus been discovered that the over-all pattern of the falling particles renders them highly susceptible to the application of a wetting medium, such as water, in a relatively fine spray and that after repeatedly falling therethrough, the particles will satisfactorily adsorb sufficient moisture to insure uniform distribution and to subsequently resist segregation. Moreover, the fact that the fine water spray through which the particles fall creates a very effective wetting area, thereby rendering the entire batch moist, assures that overly wet portions will not be created to adhere to the walls of the drum and thus retain a disproportionate quantity of the water.

For this purpose, a plurality of spray nozzles are provided within the drum and are arranged in suitably spaced relation between the end walls 26 and 27 thereof. As shown in FIGS. 1, 2 and 3, a conductor pipe 45 is passed through the plate 16 of bracket 15 and inwardly thereof is formed with an angularly offset portion 46 and a major supply portion 47 substantially parallel to the longitudinal axis of the drum. Preferably, the spacing between the axial line of pipe 45 and the portion 47 thereof is established to enable free entry of the chute 20 as shown in broken line in FIG. 1 and, more importantly, to locate the nozzles 48, attached to pipe portion 47, so that the water sprays emanating therefrom will afford uniform distribution and combine to form an uninterrupted water wall or area through which the batch particles must pass.

The location of the individual nozzles 48 with regard to the end walls of the drum, as well as their spaced relation to one another, is very critical and is determined by the specific length of the rotary drum or the distance between the end walls thereof. Generally speaking, the nozzles are attached to the supply pipe 47 in a substantially horizontal plane common to each nozzle and with the axes of the nozzles normal to the longitudinal axis of the drum. The particular type of nozzle employed is also deemed important to successful wetting of batch materials since it is undesirable to develop a total spray pattern whereby the walls of the drum are covered with unused quantities of water. To this end, narrow angle full cone spray nozzles are selected which will develop a spray cone in angles of between 25° to 35°. This results, with the selected positioning of the endmost nozzles, in substantially dry end wall conditions. As well, the relatively low pressure employed in the water system considerably reduces the tendency of the spray to "blast" through the falling batch particles and objectionably wet the surface of the metal annular wall therebeyond. Under optimum working conditions, arrangement of the spray nozzles and regulation of the pressure of the water directed therefrom in the above-described manner has been found to uniformly distribute the water spray, as indicated by the lines designated by the numeral 49, throughout the batch during the wetting phase of the mixing operation.

To reinforce and support particularly the offset portion 46 and major portion 47 of the supply pipe 45, an angular member 50 is fixed to the upper surface thereof and provided with brackets 51 and 52. By means of bracing links 53 and 54, the brackets are attached, respectively, to brackets 55 and 56 secured to the inwardly directed surface of the plate 16. This arrangement supports the "free" end of the pipe 47 in a relatively fixed horizontal plane and additionally reinforces the same against objectionable vibration during the actual mixing operation. Outwardly of the drum 10, the pipe 45 is secured to a plate bracket 58 carried by a brace 59 of the frame structure and is suitably connected to supply pipes for water and air under pressure as at 60 and 61.

In practicing the wet mixing of dry glass batch materials according to the method of this invention, predetermined sequences of time are established to first afford a preliminary mixing of the dry material, to then introduce into the falling portions of the batch materials water in a fine spray of uniform distribution under relatively low pressure, and finally to continue mixing of the batch materials in their wetted condition after introduction of the water has been discontinued. Thus it has been found advantageous to direct the wetting medium or water into the falling portions of the batch materials for a period of approximately 60 seconds at a pressure of 30 p.s.i.

It is to be understood that the form of the invention herewith shown and described is to taken as an illustrative embodiment only of the same, and that various changes in the shape, size and arrangement of parts, as well as various procedural changes may be resorted to without departing from the spirit of the invention.

I claim:
1. A method of mixing glass batch materials and distributing a wetting medium uniformly therethrough which comprises, repeatedly scooping up and elevating portions of the batch materials while simultaneously shifting said materials laterally and allowing the elevated portions to fall freely upon other portions of said batch materials to thoroughly intermix said batch materials, spraying a wetting medium substantially normally into the path of the falling batch materials from a remote source after said materials have been thoroughly intermixed to wet the discrete particles thereof, and continuing to intermix the wetted batch materials after said spray has been discontinued until said wetting medium is uniformly distributed through the intermixed batch materials.

2. A method of mixing glass batch materials and distributing a wetting medium uniformly therethrough which comprises, charging predetermined amounts of glass batch materials into a rotary mixer, rotating said mixer to repeatedly elevate and simultaneously laterally shift portions of the batch materials and allow them to fall freely onto other portions of said batch materials to thoroughly intermix said batch materials, spraying a wetting medium substantially normal to the path of the falling batch materials at a pressure of about 30 p.s.i. from a remote source for a predetermined length of time after said materials have been throughly intermixed to wet the discrete particles thereof, rotating said mixer for a predetermined length of time after said spray has been discontinued to uniformly distribute said wetting medium, and intercepting the freely falling batch materials in an inclined chute upon continued rotation of said mixer for removing the mixed and wetted batch from said mixer.

3. An apparatus for mixing glass batch materials comprising, a mixing drum mounted for rotation about a substantially horizontal axis, means at one end of said drum for charging predetermined amounts of batch materials into said mixing drum, a plurality of buckets and vanes mounted on the inner periphery of said drum for repeatedly scooping up portions of said batch materials at the bottom of said drum and allowing them to fall freely from the top thereof in response to rotation of said drum about said axis, means spaced from the path of the falling batch material for directing a spray of wetting medium substantially horizontally into said path to wet the discrete particles of said batch materials, said spray means including a substantially horizontal pipe extending into said drum, and a plurality of spray nozzles spaced along said pipe and spaced from the end walls of said drum for providing an uninterrupted spray pattern across the path of the falling batch materials while avoiding direct wetting of said end walls, said nozzles developing a spray cone in the angular range from about 25° to 35°, and means at the other end of said mixing drum for removing said batch materials from said mixing drum upon completion of the mixing cycle.

4. An apparatus for mixing glass batch materials comprising, a mixing drum mounted for rotation about a substantially horizontal axis, a first chute at one end of said drum for charging predetermined amounts of batch materials into said mixing drum, a plurality of buckets and vanes mounted on the inner periphery of said drum for repeatedly scooping up portions of said batch materials at the bottom of said drum and allowing them to fall freely from the top thereof in response to rotation of said drum, each of said vanes being angularly mounted within said drum so as to laterally shift a portion of the batch materials into a corresponding bucket during the upward movement of said vane, a substantially horizontal wetting medium supply pipe extending into said drum and offset from the path of the falling batch materials, a plurality of spray nozzles spaced along said supply pipe for directing an uninterrupted spray pattern of wetting medium across the path of the falling batch materials and substantially normal thereto so as to wet the discrete particles of said batch materials, said nozzles developing a spray cone in the angular range from about 25° to 35° and being spaced from the end walls of said drum so as to avoid direct wetting of said end walls, and a second chute swingably mounted at the other end of said mixing drum for movement into the path of said falling batch materials for removing the batch materials from the mixing drum upon completion of the mixing cycle.

References Cited by the Examiner
UNITED STATES PATENTS

| | | | |
|---|---|---|---|
| 1,108,523 | 8/1914 | Sexton | 259—161 |
| 1,689,143 | 10/1928 | Lukachovic et al. | 259—161 |
| 1,703,999 | 3/1929 | Henley | 259—148 |
| 2,152,798 | 4/1939 | Fuller | 259—146 |
| 2,278,069 | 3/1942 | Finley | 259—175 |
| 2,533,191 | 12/1950 | Jaeger | 259—168 |
| 2,583,742 | 1/1952 | Lepin et al. | 259—14 |

WALTER A. SCHEEL, *Primary Examiner.*

JAMES SHANK, *Examiner.*

BURTON FAUST, NELSON ELLISON,
*Assistant Examiners.*